(12) United States Patent
Koike et al.

(10) Patent No.: US 10,837,878 B2
(45) Date of Patent: Nov. 17, 2020

(54) PARTICULATE MATTER DETECTION SENSOR

(71) Applicant: DENSO CORPORATION, Kariya (JP)

(72) Inventors: Kazuhiko Koike, Nishio (JP);
Masayuki Tamura, Kariya (JP);
Hirokatsu Imagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 467 days.

(21) Appl. No.: 15/319,185

(22) PCT Filed: Jun. 2, 2015

(86) PCT No.: PCT/JP2015/065881
§ 371 (c)(1),
(2) Date: Dec. 15, 2016

(87) PCT Pub. No.: WO2015/194363
PCT Pub. Date: Dec. 23, 2015

(65) Prior Publication Data
US 2017/0131185 A1    May 11, 2017

(30) Foreign Application Priority Data

Jun. 16, 2014  (JP) .................................. 2014-123663

(51) Int. Cl.
*G01N 1/22*  (2006.01)
*G01N 15/06*  (2006.01)
(Continued)

(52) U.S. Cl.
CPC ....... *G01N 1/2252* (2013.01); *G01N 15/0606* (2013.01); *G01N 15/0656* (2013.01);
(Continued)

(58) Field of Classification Search
CPC ... G01N 1/2252; G01N 27/04; G01N 15/0606
See application file for complete search history.

(56) References Cited

U.S. PATENT DOCUMENTS

| 2004/0244467 | A1* | 12/2004 | Yamada | ............... | G01N 1/2252 |
| | | | | | 73/31.05 |
| 2009/0056416 | A1 | 3/2009 | Nair et al. | | |
| 2016/0025222 | A1 | 1/2016 | Buchholz et al. | | |

FOREIGN PATENT DOCUMENTS

| JP | 2008-116355 | 5/2008 |
| JP | 2012-068148 | 4/2012 |

(Continued)

*Primary Examiner* — Matthew D Krcha
(74) *Attorney, Agent, or Firm* — Nixon & Vanderhye P.C.

(57) ABSTRACT

A particulate matter detection sensor includes a particulate matter detection unit for changing the output of an electrical signal in accordance with change in the electrical characteristics due to the deposition of particulate matter contained in an exhaust gas G discharged from an internal combustion engine, and a cover member having a cylindrical cover wall and disposed to surround the particulate matter detection unit. The particulate matter detection unit includes a deposition portion on which a part of the particulate matter is deposited, and a plurality of detection electrodes disposed being spaced apart from each other on the deposition portion. The deposition portion of the particulate matter detection unit is arranged so as to be oriented towards the tip side of the cover member. The cover wall of the cover member includes a plurality of exhaust gas introduction holes formed at positions closer to the tip side than is the deposition portion.

10 Claims, 12 Drawing Sheets

(51) Int. Cl.
*G01N 27/04* (2006.01)
*G01N 15/00* (2006.01)
(52) U.S. Cl.
CPC ..... *G01N 27/04* (2013.01); *G01N 2001/2223* (2013.01); *G01N 2015/0046* (2013.01)

(56) References Cited

FOREIGN PATENT DOCUMENTS

| | | |
|---|---|---|
| JP | 2012-078130 | 4/2012 |
| JP | 2012-168143 | 9/2012 |
| JP | 2013-238584 | 11/2013 |

* cited by examiner (A)

(B)

PARTICULATE MATTER DETECTION SENSOR

CROSS-REFERENCE TO RELATED APPLICATIONS

This application is the U.S. national phase of International Application No. PCT/JP2015/065881 filed Jun. 2, 2015, which designated the U.S. and claims priority to Japan Patent Application No. 2014-123663 filed on Jun. 16, 2014, the entire contents of each of which are hereby incorporated herein by reference.

BACKGROUND

Technical Field

The present invention relates to a particulate matter detection sensor for detecting particulate matter contained in an exhaust gas discharged from an internal combustion engine.

Background Art

Internal combustion engines are provided with an exhaust gas purification device which is arranged in in the exhaust pipe of the engine to collect particulate matter (particulate matter: PM) contained in an exhaust gas. Such an exhaust gas purification device includes a particulate matter detection device having a particulate matter detection sensor for detecting the amount of particulate matter contained in the exhaust gas. A failure in the exhaust gas purification device is detected based on the information obtained by the particulate matter detection device.

For example, PTL 1 discloses a particulate matter detection sensor which is used in an exhaust gas purification device. The particulate matter detection sensor of PTL 1 includes a detection unit and a cover containing the detection unit. The detection unit includes a deposition portion on which the particulate matter is deposited. The deposition portion is formed on a side surface oriented to a direction perpendicular to the axial direction of the particulate matter detection sensor. Further, the cover is provided with an introduction hole which is formed at an upstream position facing the deposition portion.

Patent Literature (PTL)1 JP-A 2012-68148

TECHNICAL PROBLEM

However, the particulate matter detection sensor of PTL 1 has the following problem.

In the particulate matter detection sensor of PTL 1, it is necessary to dispose the deposition portion and the introduction hole facing the deposition portion so as to be oriented upstream of the flow direction of the exhaust gas flowing in the exhaust pipe to thereby improve the detection accuracy of the particulate matter. Therefore, it is necessary to control the assembly angle of the particulate matter detection sensor, and thus, the number of steps and cost involved in the assembly are increased.

SUMMARY

In light of the background set forth above, the present invention has been desired and made to provide a particulate matter detection sensor which improves assembling workability and detection accuracy of the particulate matter.

According to an aspect of the present invention, a particulate matter detection sensor is characterized in that the sensor includes a particulate matter detection unit including a deposition portion on which a part of particulate matter contained in an exhaust gas discharged from an internal combustion engine is deposited, and a plurality of detection electrodes disposed being spaced apart from each other on the deposition portion, wherein an output of an electrical signal is changed according to change of electrical characteristics due to the deposition of the particulate matter on the deposition portion; and a cover member including a cylindrical cover wall arranged so as to surround the particulate matter detection unit. In the sensor, the deposition portion of the particulate matter detection unit is disposed so as to be oriented towards a tip side of the cover member; and the cover wall of the cover member is provided with a plurality of exhaust gas introduction holes which are formed at positions closer to the tip side than the deposition portion is.

In the particulate matter detection sensor, the deposition portion is arranged so as to be oriented towards the tip side of the cover. Therefore, if the assembly angle of the particulate matter detection sensor is changed in the circumferential direction centering on the center axis of the particulate matter detection sensor, the orientation of the deposition portion does not change relative to the flow direction of the exhaust gas. Being provided with the plurality of exhaust gas introduction holes in the cover member, the exhaust gas can stably flow in from the exhaust gas introduction holes if the assembly angle of the particulate matter detection sensor is changed in the circumferential direction. Thus, it is not necessary to control the assembly angle of the particulate matter detection sensor in the circumferential direction, and the particulate matter detection sensor can be easily assembled.

The exhaust gas flows into a space on the tip side of the deposition portion, from the plurality of exhaust gas introduction holes. Therefore, the exhaust gas easily contacts the deposition portion, and the particulate matter can be efficiently deposited on the deposition portion.

As stated above, according to the particulate matter detection sensor, assembling workability is improved and detection accuracy of the particulate matter can be improved.

In the particulate matter detection sensor, the plurality of exhaust gas introduction holes are preferably formed at even intervals, when viewed from the axial direction. In this case, the plurality of exhaust gas introduction holes can be arranged in a balanced manner. Thus, the flow rate of the exhaust gas flowing from the plurality of exhaust gas introduction holes to the inside of the cover member can be stabilized.

The cover member preferably has an exhaust gas discharge hole which is opened in the tip thereof. In this case, the exhaust gas can be efficiently introduced from the plurality of exhaust gas introduction holes by discharging the exhaust gas inside the cover member from the exhaust gas discharge holes.

The exhaust gas introduction holes are preferably each provided with a rectifying member designed to come close to the deposition portion as it inclines towards the inside of the cover member. In this case, the exhaust gas that flows in from the exhaust gas introduction holes is permitted to efficiently contact the deposition portion.

It is preferable that the cover member has an outer periphery around which a cylindrical outer cover member is arranged so as to be coaxial with the cover member, the outer cover member having a plurality of outer introduction holes so that an exhaust gas introduced from the plurality of outer introduction holes is ensured to be introduced to the inside of the cover member from the exhaust gas introduction holes after change of the introduction direction. In this case, moisture as well as contaminants, such as, coarse particulate matter that does not contribute to change of electrical characteristics, can be separated from the exhaust gas when the introduction direction of the exhaust gas is changed. Further, the exhaust gas can be dispersed by the exhaust gas flowing in a space between the cover member and the outer cover member, and the inflow of the exhaust gas from the exhaust gas introduction holes can be made uniform. Thus, detection accuracy of particulate matter in the particulate matter detection sensor can be further improved.

The plurality of outer introduction holes are preferably formed at positions closer to the tip side than are the plurality of exhaust gas introduction holes. In this case, the introduction direction of the exhaust gas can be easily changed, and moisture as well as contaminants, such as coarse particulate matter that does not contribute to change of electrical characteristics, can be separated from the exhaust gas. Specifically, when the axial direction is defined as the vertical direction and the tip side is defined as the downward direction, heavy moisture and coarse particulate matter can be more efficiently separated.

Further, when viewed from the axial direction, the plurality of outer introduction holes are preferably radially aligned with the respective plurality of exhaust gas introduction holes. In this case, the flow of the exhaust gas can be formed from the plurality of outer introduction holes side towards the plurality of exhaust gas introduction holes. Thus, the exhaust gas is permitted to flow from the exhaust gas introduction holes towards the deposition portion, and the exhaust gas is permitted to efficiently contact the deposition portion. Therefore, detection accuracy of the particulate matter detection sensor can be further improved.

Further, when viewed from the axial direction, the plurality of outer introduction holes are preferably formed at positions deviated in a circumferential direction from the positions of the respective plurality of exhaust gas introduction holes. In this case, the exhaust gas can be efficiently dispersed in a space between the cover member and the outer cover member. Thus, the exhaust gas can flow in from the plurality of exhaust gas introduction holes to the inside of the cover member in a balanced manner.

The above and other objects, features and advantages of the present invention will be readily apparent and fully understood from the following detailed description of preferred embodiments, taken in connection with the appended drawings.

DESCRIPTION OF THE EMBODIMENTS

With reference to the appended drawings, hereinafter will be described in detail some embodiments of the present invention. The present invention may, however, be embodied in numerous different modes and should not be construed as limited to the embodiments set forth herein. Rather, the following embodiments are provided so that the disclosure of the present invention will be thorough and complete, and will fully convey the scope of the invention to those skilled in the art. It should be noted that the like reference signs indicate similar components across all of the drawings.

(First Embodiment)

With reference to FIGS. 1 to 4, an embodiment of the particulate matter detection sensor will be described.

Figure 1:
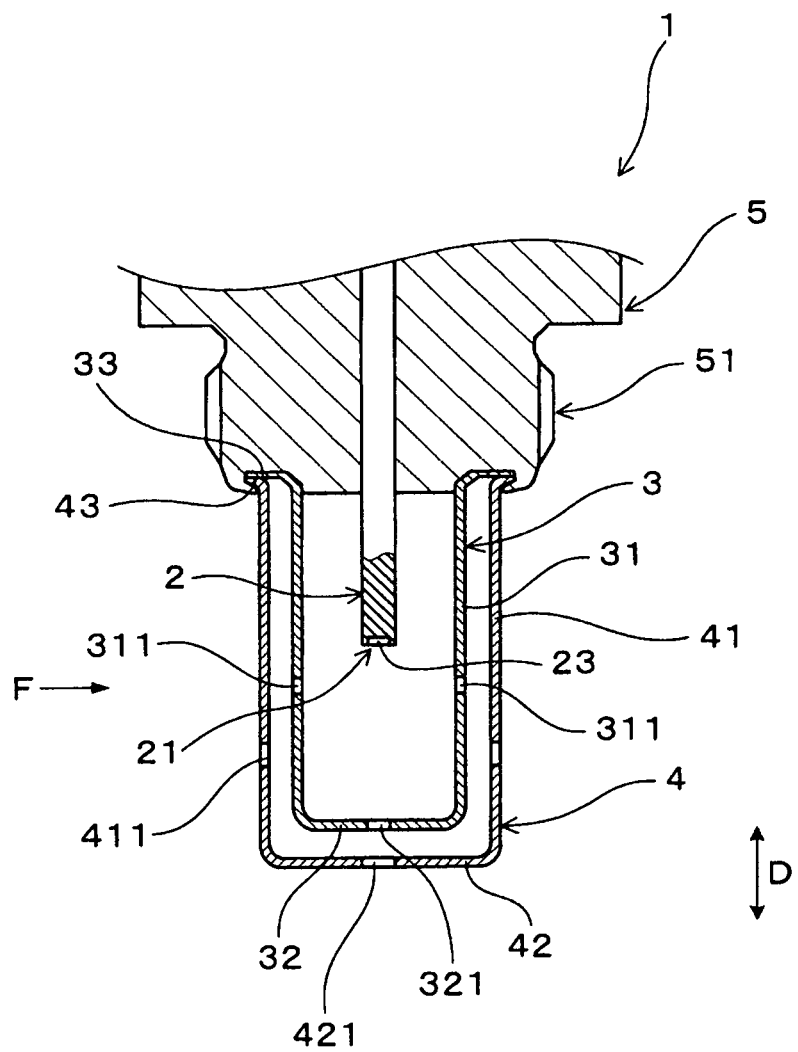
FIG. 1 is a diagram illustrating a particulate matter detection sensor according to a first embodiment.
Figure 2:
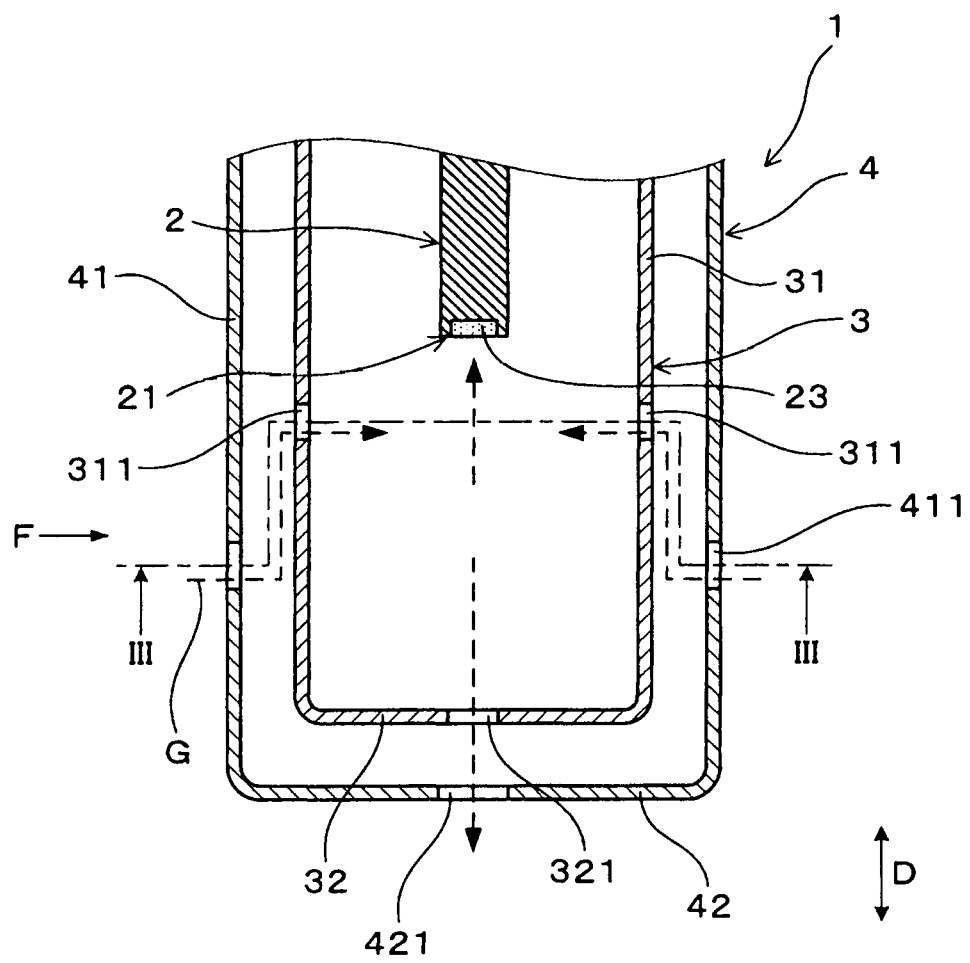
FIG. 2 is a partially enlarged view illustrating part of the particulate matter detection sensor of FIG. 1.

As shown in FIGS. 1 and 2, a particulate matter detection sensor 1 is provided with a particulate amount detector 2 for changing the output of an electrical signal according to the change of electrical characteristics due to deposition of the particulate matter contained in an exhaust gas G discharged from an internal combustion engine, and a cover member 3 including a cylindrical cover wall 31 arranged so as to surround the particulate amount detector 2. The particulate amount detector 2 is provided with a deposition portion 21 on which a part of particulate matter is deposited, and a plurality of detection electrodes 23 disposed on the deposition portion 21 so as to be spaced apart from each other. The deposition portion 21 of the particulate amount detector 2 is arranged so as to be oriented towards the tip of the cover member 3. The cover wall 31 of the cover member 3 is provided with a plurality of exhaust gas introduction holes 311 formed at positions closer to the tip side than is the deposition portion 21.

Further details are set forth below.

The particulate matter detection sensor 1 of the present embodiment is used for detecting the particulate matter contained in the exhaust gas G which is exhausted from an internal combustion engine mounted in a motor vehicle through an exhaust pipe. The information obtained by the particulate matter detection sensor 1 is used as a basis for detecting a failure of an exhaust gas purification device.

The particulate matter detection sensor 1 is arranged inside the exhaust pipe so as to protrude inward. In the particulate matter detection sensor 1 arranged inside the exhaust pipe, an end portion side in the axial direction D is defined as a tip side, and the side opposite thereto is defined as a base side. However, in the present embodiment, the axial direction D coincides with the vertical direction, with the tip side being downwards and the base side being upwards. Further, the direction in which the exhaust gas G flows within the exhaust pipe is referred to as a flow direction F.

Figure 3:
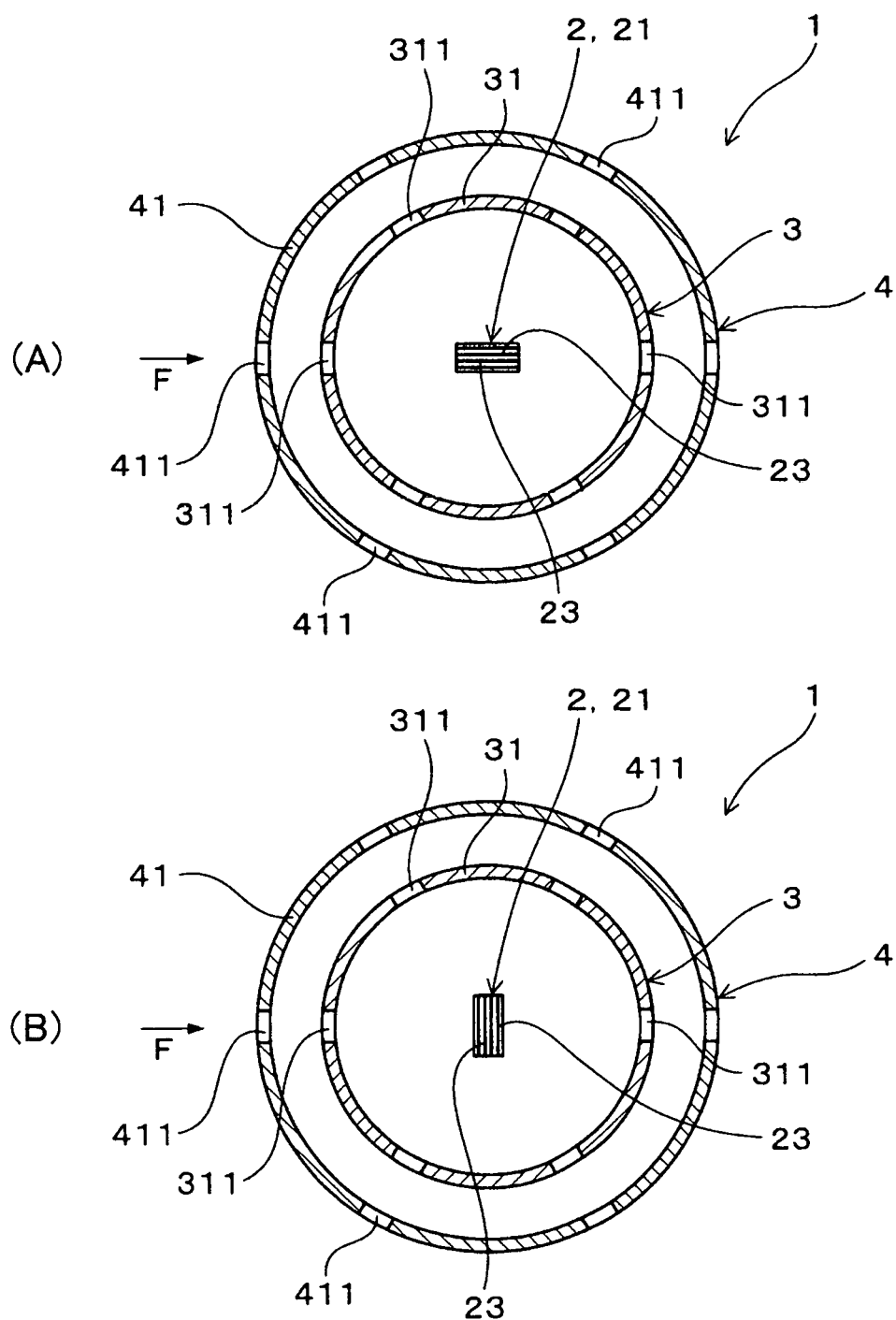
FIG. 3 is a set of cross-sectional views (corresponding to the cross-sectional view taken along the line III-III of FIG. 2), with (A) being a cross-sectional view illustrating the particulate matter detection sensor with an assembly angle of 0°, and (B) being a cross-sectional view illustrating the particulate matter detection sensor with an assembly angle of 90°, according to the first embodiment.

As shown in FIGS. 1 to 3, in addition to the aforementioned particulate amount detector 2 and the cover member 3, the particulate matter detection sensor 1 is provided with an outer cover member 4 for covering the cover member 3, and a housing member 5 for holding these components.

The housing member 5, which is in a substantially cylindrical shape, has an interior into which the particulate amount detector 2 is inserted and held, and has a tip surface where the cover member 3 and the outer cover member 4 are held. Further, the housing member 5 has an outer peripheral surface in which a male screw portion 51 is formed. The male screw portion 51 is threadably engaged with a screw hole formed in the exhaust pipe to expose the tip side of the particulate matter detection sensor 1 in the exhaust pipe and fix, in this state, the particulate matter detection sensor 1 to the exhaust pipe. The particulate matter detection sensor 1 is arranged downstream of the exhaust gas purification device in the exhaust pipe.

Figure 4:
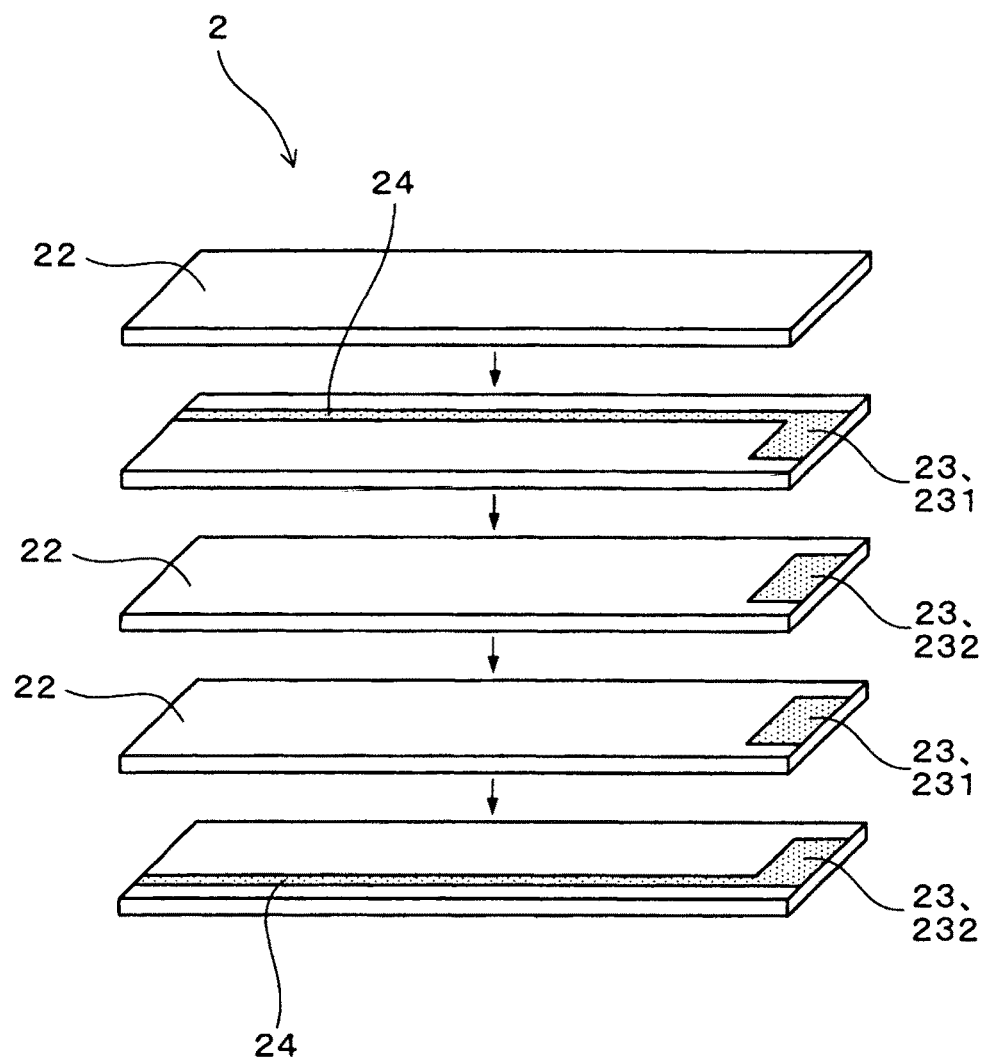
FIG. 4 is a diagram illustrating a structure of a deposition portion, according to the first embodiment.
Figure 5:
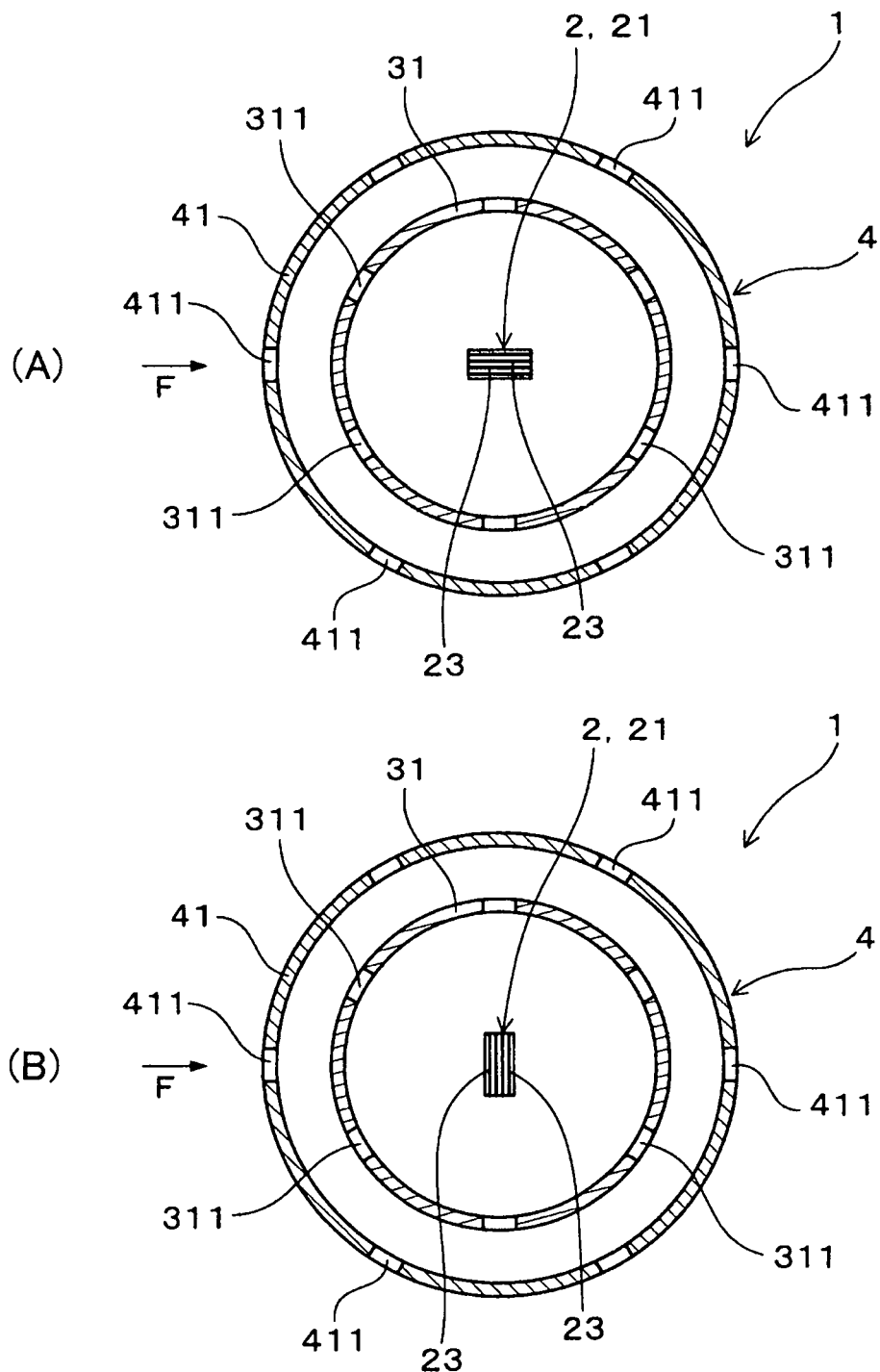
FIG. 5 is a set of cross-sectional views (corresponding to the cross-sectional view taken along the line III-III of FIG. 2), with (A) being a cross-sectional view illustrating a particulate matter detection sensor with an assembly angle of 0°, and (B) being a cross-sectional view illustrating a particulate matter detection sensor with an assembly angle of 90°, according to a second embodiment.

The particulate amount detector 2 includes the deposition portion 21 on which the particulate matter in the exhaust gas G is deposited, and the plurality of detection electrodes 23 arranged being spaced apart from each other on the deposition portion 21. As shown in FIG. 4, the particulate amount detector 2 is formed in a bar shape by laminating five substrates 22 each of which is made of an insulating material formed into a plate shape. Four among the five substrates 22 are respectively provided with detection electrodes 23 made of a conductive material on the tip side of respective main surfaces, for alternate lamination of positive electrodes 231 and negative electrodes 232. Further, of the four electrodes, two electrodes respectively formed with the positive electrode 231 and the negative electrode 232 are further formed with respective extraction electrode portions 24 extending from the detection electrodes 23 to the base side.

The deposition portion 21 is formed on the tip of the particulate amount detector 2 formed by laminating the five substrates 22. Due to the particulate matter deposited on the deposition portion 21, the detection electrodes 23 exposed to the deposition portion 21 become mutually conductive to reduce the electrical resistance between the detection electrodes 23. Since a voltage is applied across the detection electrodes 23, change in the electrical resistance across the detection electrodes 23 causes change in the amount of current as an electrical signal flowing between the detection electrodes 23. Thus, the current outputted from the particulate amount detector 2 is changed. In short, the current outputted from the particulate amount detector 2 changes in accordance with the amount of particulate matter deposited onto the deposition portion 21. This means that the current contains the information relating to the amount of particulate matter deposited. Use of this current enables detection of the amount of particulate matter deposited on the deposition portion 21. In the present embodiment, the current detected by the particulate matter detection unit is outputted to a control unit (not shown) provided with a shunt resistance. The control unit outputs a voltage that is a product of the current and the shunt resistance. This voltage corresponds to the output of the particulate matter detection sensor 1.

As shown in FIGS. 1 to 3, the cover member 3 has a cylindrical cover wall 31 surrounding the particulate amount detector 2, a cover bottom 32 formed on the tip of the cover wall 31, and a cover flange 33 protruding outwards from the base end of the cover wall 31. The cover member 3 is fixed to the housing member 5, with the cover flange 33 being crimped onto the tip surface of the housing member 5.

The cover wall 31 is formed with six exhaust gas introduction holes 311. The exhaust gas introduction holes each have a circular shape and, when viewed from the axial direction D, are formed at even intervals in the circumferential direction of the cover wall 31. Further, the exhaust gas introduction holes 311 are formed at positions closer to the tip side than the deposition portion 21 of the particulate amount detector 2 is.

The cover bottom 32 has a center where an exhaust gas discharge hole 321 is formed penetrating in the axial direction D.

The outer cover member 4 includes a cylindrical outer wall 41 to surrounding the cover member 3, an outer cover bottom 42 formed on a tip of the outer wall 41, and an outer flange 43 protruding outwards from the base end of the outer wall 41. The outer cover member 4 is fixed to the housing member 5, with the outer flange 43 being crimped onto the tip surface of the housing member 5 together with the cover flange 33 of the cover member 3.

The outer wall 41 is formed with six outer introduction holes 411. The outer introduction holes 411 each have a circular shape and, when viewed from the axial direction D, are formed at even intervals in the circumferential direction of the outer wall 41 so as to be radially aligned with the respective exhaust gas introduction holes 311. The outer introduction holes 411 are formed at positions closer to the tip side than the exhaust gas introduction holes 311 are.

The outer cover bottom 42 has a center where an outer discharge hole 421 is formed penetrating in the axial direction D.

The particulate matter detection sensor 1 of the present embodiment is configured so that the exhaust gas G that has been introduced from the plurality of outer introduction holes 411 is introduced from the exhaust gas introduction holes 311 into the inside of the cover member 3 after change of the introduction direction. Namely, the exhaust gas G flows into the inside of the outer cover member 4 from the plurality of outer introduction holes 411, along the flow direction F of the exhaust gas G in the exhaust pipe. Then, the exhaust gas G collides with the cover wall 31 of the cover member 3, for the change of the introduction direction to a direction parallel to the cover wall 31. Then, the exhaust gas G flows through a space between the cover member 3 and the outer cover member 4, and flows into the inside of the cover member 3 from the exhaust gas introduction holes 311.

Next, advantageous effects of the present example will be to described.

In the particulate matter detection sensor 1, the deposition portion 21 is arranged so as to be oriented towards the tip of the cover member 3. Therefore, if the assembly angle of the particulate matter detection sensor 1 is changed in the circumferential direction centering the center axis of particulate matter detection sensor 1, the orientation of the deposition portion 21 does not change relative to the flow direction F of the exhaust gas G. Further, the cover member 3 is provided with a plurality of exhaust gas introduction holes 311. Thus, if the assembly angle of the particulate matter detection sensor 1 is changed in the circumferential direction, the exhaust gas G can stably flow in from the exhaust gas introduction holes 311. Therefore, it is not necessary to control the assembly angle of the particulate matter detection sensor 1 in the circumferential direction and accordingly the particulate matter detection sensor 1 can be easily assembled.

Further, the exhaust gas G flows in from the plurality of exhaust gas introduction holes 311 to the space on the tip side of the deposition portion 21. Therefore, the exhaust gas G easily contacts the deposition portion 21, and particulate matter can be efficiently deposited on the deposition portion 21.

The plurality of exhaust gas introduction holes 311 are formed at even intervals when viewed from the axial direction D. This means that the plurality of exhaust gas introduction holes 311 are arranged in a balanced manner. With this configuration, the inflow of the exhaust gas G flowing in from the plurality of exhaust gas introduction holes 311 to the inside of the cover member 3 can be stabilized.

The cover member 3 has the exhaust gas discharge hole 321 opened in the tip thereof. Therefore, the exhaust gas G can be efficiently introduced from the plurality of exhaust gas introduction holes 311 by discharging the exhaust gas G inside the cover member 3 from the exhaust gas discharge hole 321.

The cylindrical outer cover member 4 is arranged on the outer peripheral side of the cover member 3 so as to be coaxial with the cover member 3. The outer cover member 4 has a plurality of outer introduction holes 411, and is configured such that the exhaust gas G introduced from the plurality of outer introduction holes 411 is introduced into the inside of the cover member 3 from the exhaust gas introduction holes 311 after change of the introduction direction. Therefore, moisture as well as contaminants, such as coarse particulate matter that does not contribute to the change of electrical characteristics, can be separated from the exhaust gas G when the introduction direction of the exhaust gas G is changed. Further, the exhaust gas G can be dispersed by causing the exhaust gas G to flow in a space between the cover member 3 and the outer cover member 4, whereby the inflow of the exhaust gas G from the exhaust gas introduction holes 311 can be made uniform. With this configuration, the detection accuracy of the particulate matter in the particulate matter detection sensor 1 can be further improved.

The plurality of outer introduction holes 411 are formed at positions closer to the tip side than the plurality of exhaust gas introduction holes 311 are. Therefore, the introduction direction of the exhaust gas G can be easily changed, and moisture as well as contaminants, such as coarse particulate matter that does not contribute to change of electrical characteristics, can be separated from the exhaust gas G. In the present embodiment, the axial direction D is defined as the vertical direction and the tip side is defined as the downward direction, and thus heavy moisture and coarse particulate matter can be more efficiently separated.

When viewed from the axial direction D, the plurality of outer introduction holes 411 are formed so as to be radially aligned with the respective plurality of exhaust gas introduction holes 311. Therefore, the flow of the exhaust gas G can be formed from the plurality of outer introduction holes 411 side towards the plurality of exhaust gas introduction holes 311. With this configuration, the exhaust gas G is permitted to flow from the exhaust gas introduction holes 311 to the deposition portion 21, and to efficiently contact the deposition portion 21. In this way, the detection accuracy of the particulate matter detection sensor 1 can be further improved.

The outer cover member 4 has an outer discharge hole 421 which is opened in the tip thereof. Therefore, the exhaust gas G can be efficiently introduced from the plurality of outer introduction holes 411 by discharging the exhaust gas G inside the outer cover member 4 from the outer discharge hole 421.

The particulate amount detector 2 changes the output of an electrical signal in accordance with the change of electrical resistance between the detection electrodes 23. The particulate amount detector 2 of electrical resistance type that makes use of the change of electrical resistance across the detection electrodes 23 has a high detection accuracy of the particulate matter and a low variation compared to the particulate amount detector 2 of other types. Therefore, the detection accuracy of the amount of deposition of the particulate matter can be further improved.

As stated above, according to the particulate matter detection sensor 1 of the present embodiment, the assembling workability improves, and the detection accuracy of the particulate matter can be improved.

(Second Embodiment)

The present embodiment has a structure partially modified from that of the particulate matter detection sensor 1 according to the first embodiment.

In the particulate matter detection sensor 1 of the present example, the exhaust gas introduction holes 311 of the cover member 3 are disposed at positions deviated, in the circumferential direction, from the positions of the outer introduction holes 411 of the outer cover member 4, when viewed from the axial direction D. In the present example, each outer introduction hole 411 is arranged in an intermediate position between the adjacently arranged exhaust gas introduction holes 311.

The rest of the configuration is similar to the first embodiment. Of the reference signs used in the present embodiment and the drawings related to the present embodiment, the like reference signs used in the first embodiment indicate components similar to those of the first embodiment unless otherwise specified.

In the particulate matter detection sensor 1 of the present embodiment, when viewed from the axial direction D, the plurality of outer introduction holes 411 are formed at positions deviated, in the circumferential direction, from the positions of the respective plurality of exhaust gas introduction holes 311. Therefore, the exhaust gas G can be efficiently dispersed in the space between the cover member 3 and the outer cover member 4. Thus, the exhaust gas G is permitted to flow in from the plurality of exhaust gas introduction holes 311 to the inside of the cover member 3 in a balanced manner.

(Third Embodiment)

The present embodiment has a structure partially modified from that of the particulate matter detection sensor 1 according to the first embodiment.

Figure 6:
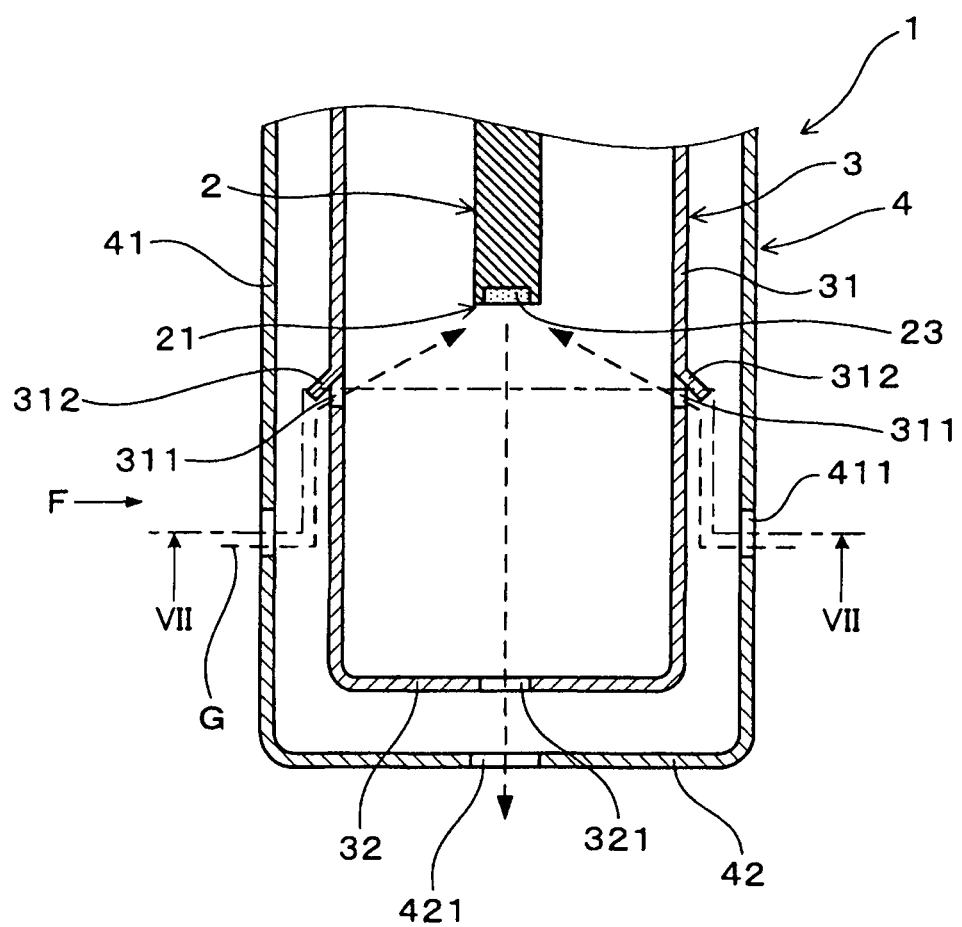
FIG. 6 is a diagram illustrating a particulate matter detection sensor, according to a third embodiment.
Figure 7:
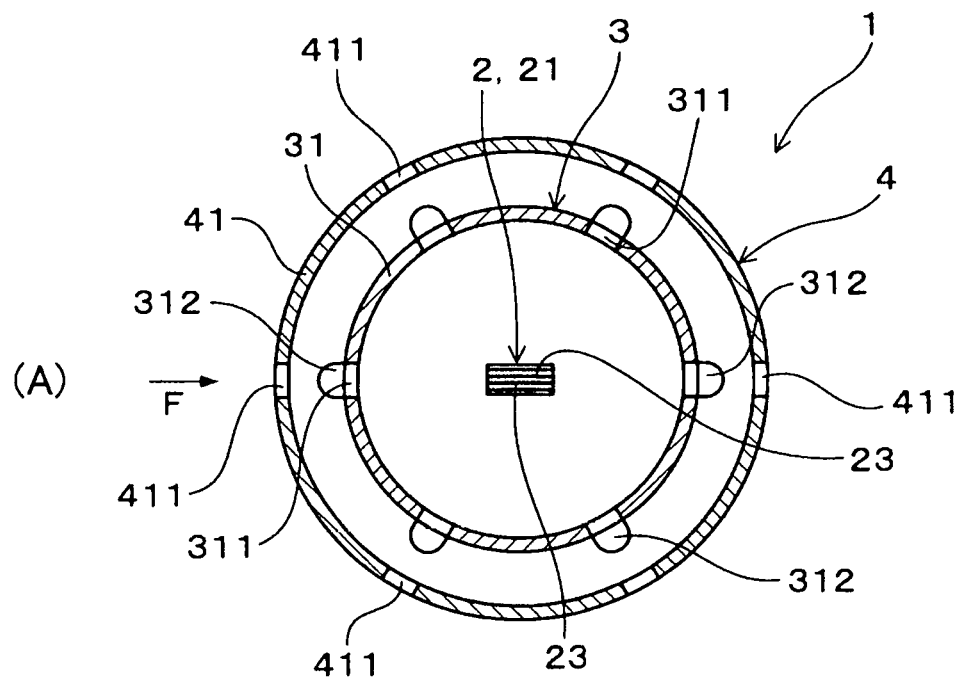
FIG. 7 is a set of cross-sectional views (corresponding to the cross-sectional view taken along the line VII-VII of FIG. 6), with (A) being a cross-sectional view illustrating the particulate matter detection sensor with an assembly angle of 0°, and (B) being a cross-sectional view illustrating the particulate matter detection sensor with an assembly angle of 90°, according to the third embodiment.
Figure 7:
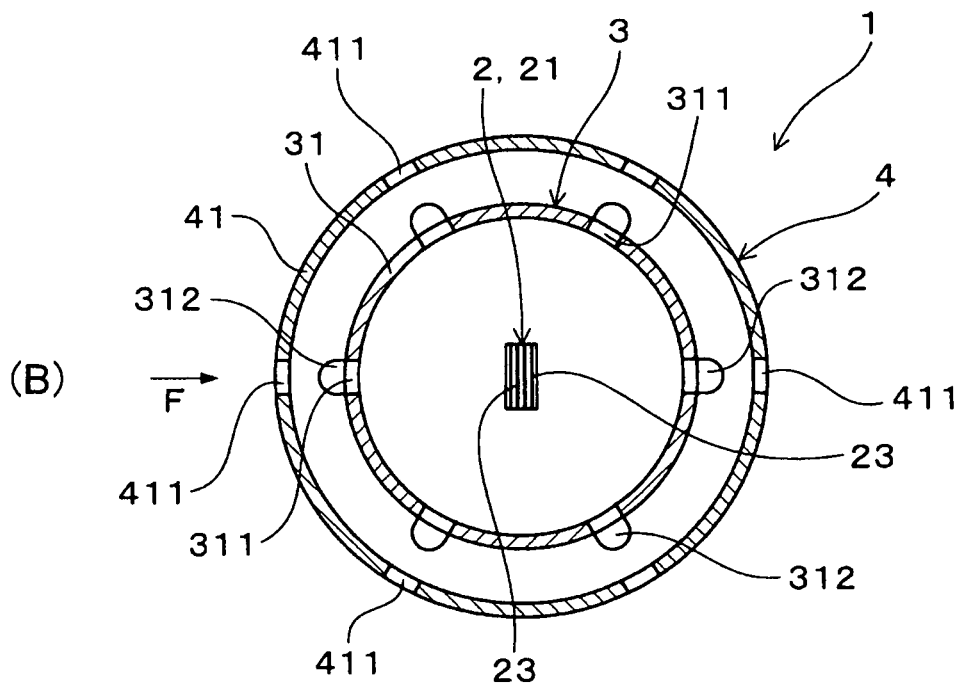

As shown in FIGS. 6 and 7, the exhaust gas introduction holes 311 in the particulate matter detection sensor 1 of the present embodiment are each provided with a rectifying member 312. The rectifying member 312 is formed by cutting a part of the cover wall 31 so that the tip side is raised outwards relative to the cover member 3. Each rectifying member 312 is designed to be closer to the deposition portion 21 as it inclines from the tip side towards the inside of the cover member 3. Further, the tip of the rectifying member 312 is formed into a substantially semicircular shape.

The rest of the configuration is similar to the first embodiment. Of the reference signs used in the present embodiment and the drawings related to the present embodiment, the like reference signs used in the first embodiment indicate components similar to those of the first embodiment unless otherwise specified.

In the particulate matter detection sensor 1 of the present embodiment, the exhaust gas introduction holes 311 are each provided with the rectifying member 312 which is designed to be closer to the deposition portion 21 as it inclines towards the inside of the cover member 3. Therefore, the exhaust gas G flowing in from the exhaust gas introduction holes 311 is permitted to efficiently contact the deposition portion 21.

(Confirmatory Tests)

In confirmatory tests, detection accuracy of the particulate matter detection sensors 1 of the embodiments was compared with that of a comparative example by changing the assembly angle.

The particulate matter detection sensors 1 of the first to third embodiments were used.

Figure 8:
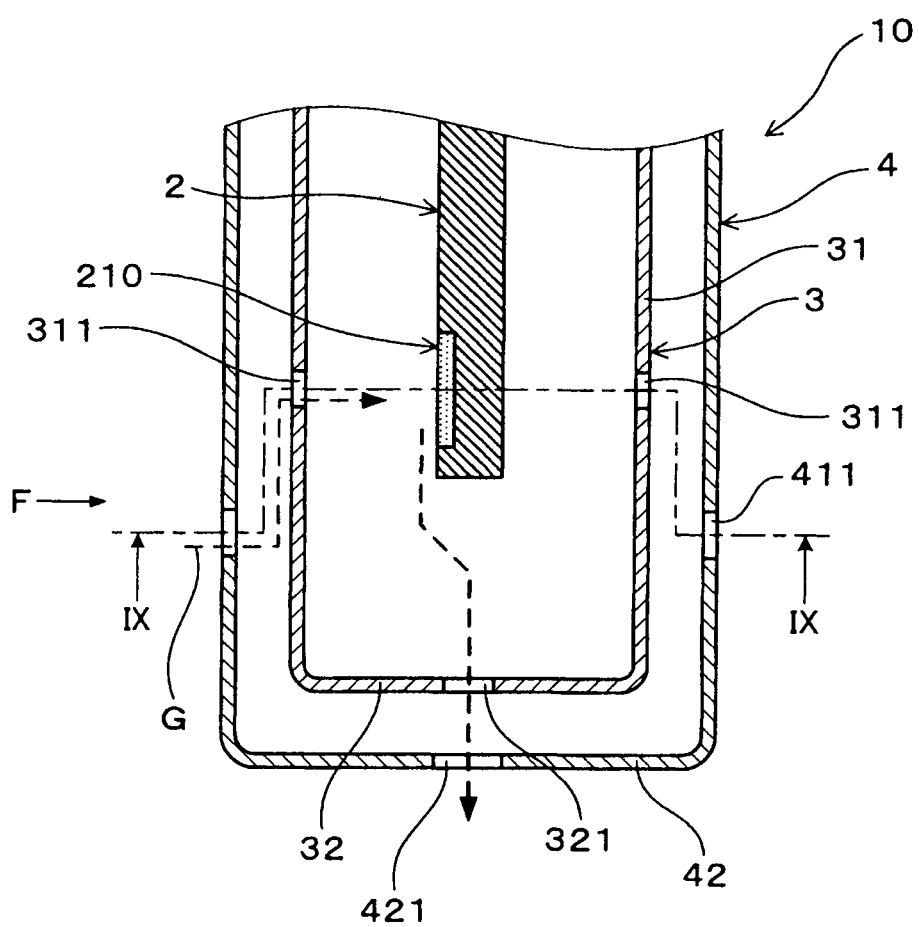
FIG. 8 is a diagram illustrating a particulate matter detection sensor, according a comparative example.
Figure 9:
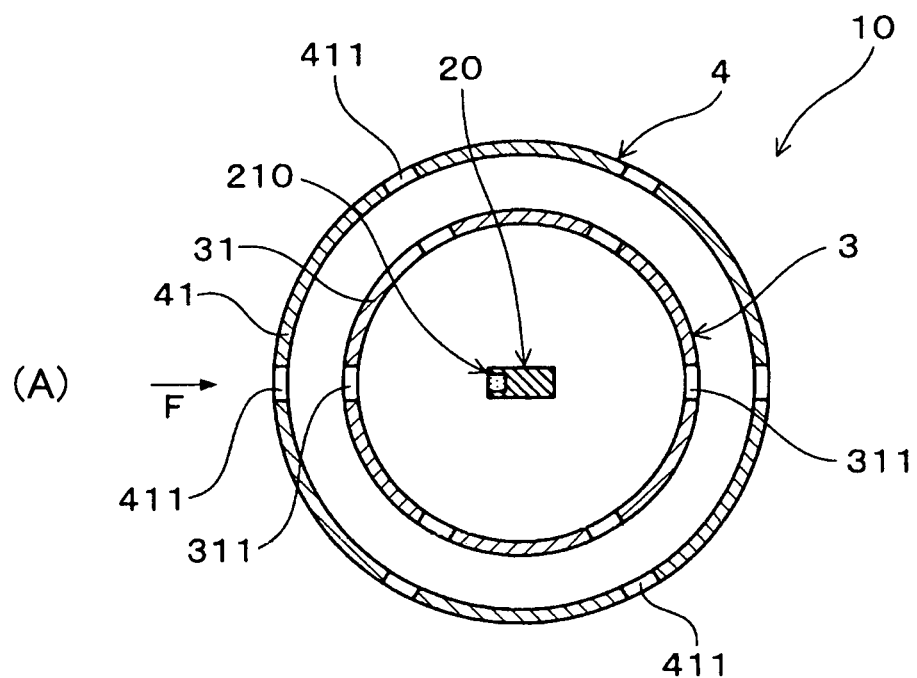
FIG. 9 is a set of cross-sectional views (corresponding to the cross-sectional view taken along the line IX-IX of FIG. 2), with (A) being a cross-sectional view illustrating the particulate matter detection sensor with an assembly angle of 0°, and (B) being a cross-sectional view illustrating the particulate matter detection sensor with an assembly angle of 90°, according to the comparative example.
Figure 9:
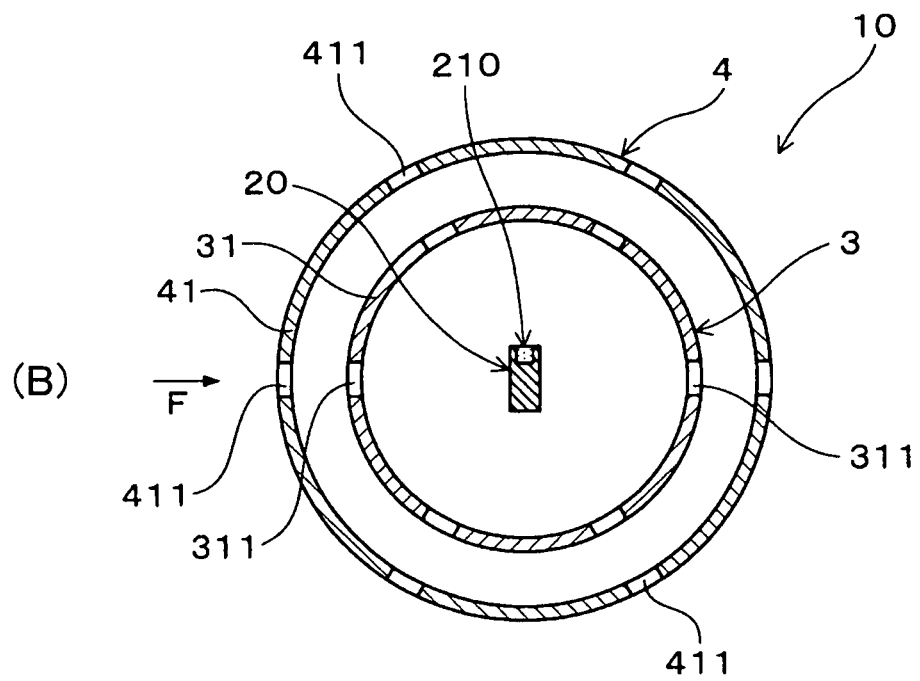

As shown in FIGS. 8 and 9, a particulate matter detection sensor 10 used as a comparative example included a particulate amount detector 20 having a deposition portion 210 which was formed in the direction perpendicular to the axial direction D of the particulate matter detection sensor 10, as well as a cover member 3 and an outer cover member 4 similar to those of the first embodiment. However, the cover member 3 was arranged so that one of the exhaust gas introduction holes 311 faced the deposition portion 210.

The rest of the configuration is similar to the first embodiment. Of the reference signs used In the present embodiment and the drawings related to the present embodiment, the like reference signs used in the first embodiment indicate components similar to those of the first embodiment unless otherwise specified.

The particulate matter detection sensors 1 and 10 of the first to third embodiments and the comparative example were assembled to the exhaust pipe, and the exhaust gas G was permitted to flow through the exhaust pipe. Then, a minimum detection amount was measured. The minimum detection amount is a smallest value of a detectable deposition amount in each of the particulate matter detection sensors 1 and 10.

FIGS. 3(A), 5(A), 7(A) and 9(A) each show a state in which the assembly angle of the particulate matter detection sensors 1 and 10 was 0°. Further, FIGS. 3(B), 5(B), 7(B) and 9(B) show the particulate matter detection sensors 1 and 10 rotated around the center axis by 90° relative to the assembly angle of 0°, so as to be in a state of having an assembly angle of 90°. Detection accuracy was compared between the particulate matter detection sensors of the first to third embodiments and that of the comparative example, when the assembly angles were set to 0° and 90°.

Figure 10:
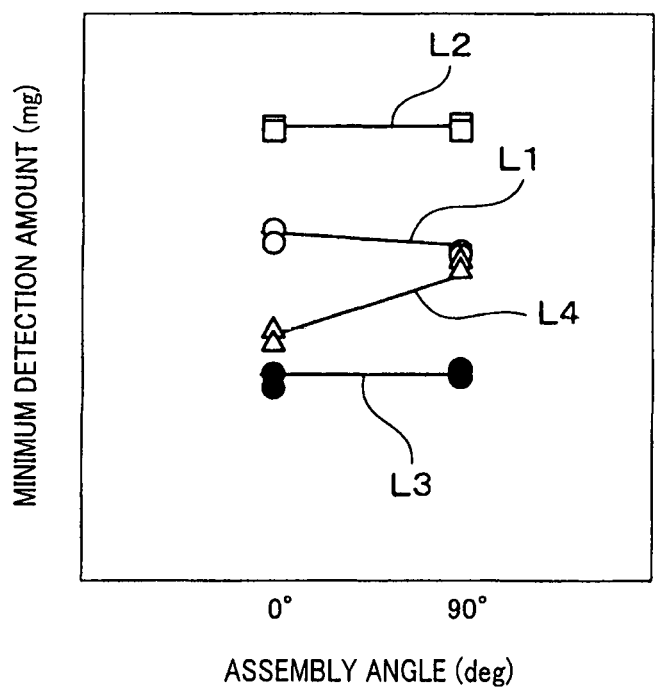
FIG. 10 is a graph illustrating a relationship between minimum detection amount and assembly angle, according to confirmatory tests.

FIG. 10 is a graph in which the vertical axis is the minimum detection amount and the horizontal axis is the assembly angle of the particulate matter detection sensors 1 and 10. FIG. 10 shows the particulate matter detection sensors 1 and 10 of the first embodiment as indicated by the solid line L1, of the second embodiment as indicated by the solid line L2, of the third embodiment as indicated by the solid line L3 indicates, and of the comparative example as indicated by the solid line L4.

As shown in FIG. 10, it was found that, in the particulate matter detection sensors 1 of the first to third embodiments, variation of the minimum detection amount depending on the assembly angle was small compared to the particulate matter detection sensor 10 of the comparative example. In short, in the first to third embodiments, variation in detection accuracy depending on the assembly angle was small.

Further, in the particulate matter detection sensor 1 of the third embodiment, it was found that the minimum detection amount was small compared to the particulate matter detection sensors 1 and 10 of the first and second embodiments and the comparative example. In short, in the third embodiment, the detection accuracy was improved.

(Fourth Embodiment)

In the present embodiment, the shape of the rectifying member in the particulate matter detection sensor of the third embodiment was partially modified.

Figure 11:
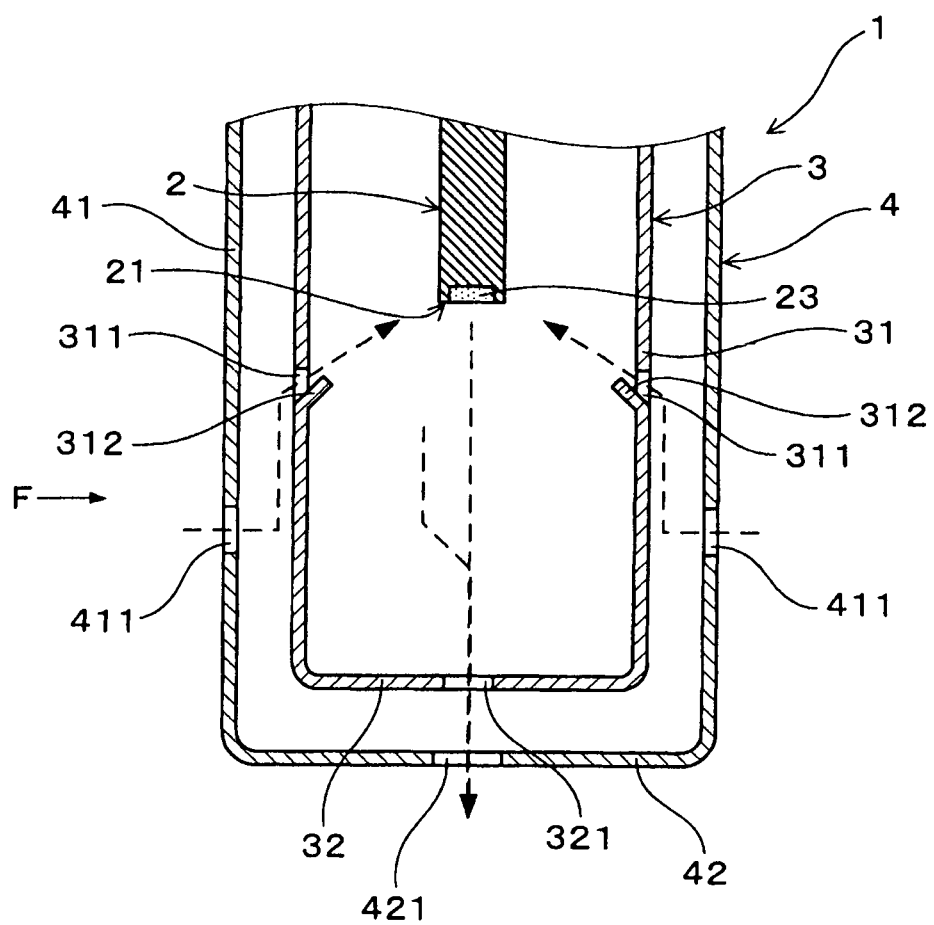
FIG. 11 is a diagram illustrating an example of a particulate matter detection sensor, according to a fourth embodiment.

FIG. 11 shows the particulate matter detection sensor 1 in which the rectifying member 312 in each of the exhaust gas introduction holes 311 is formed by cutting a part of the cover wall 31 such that the base side is oriented outwards relative to the cover member 3.

Figure 12:
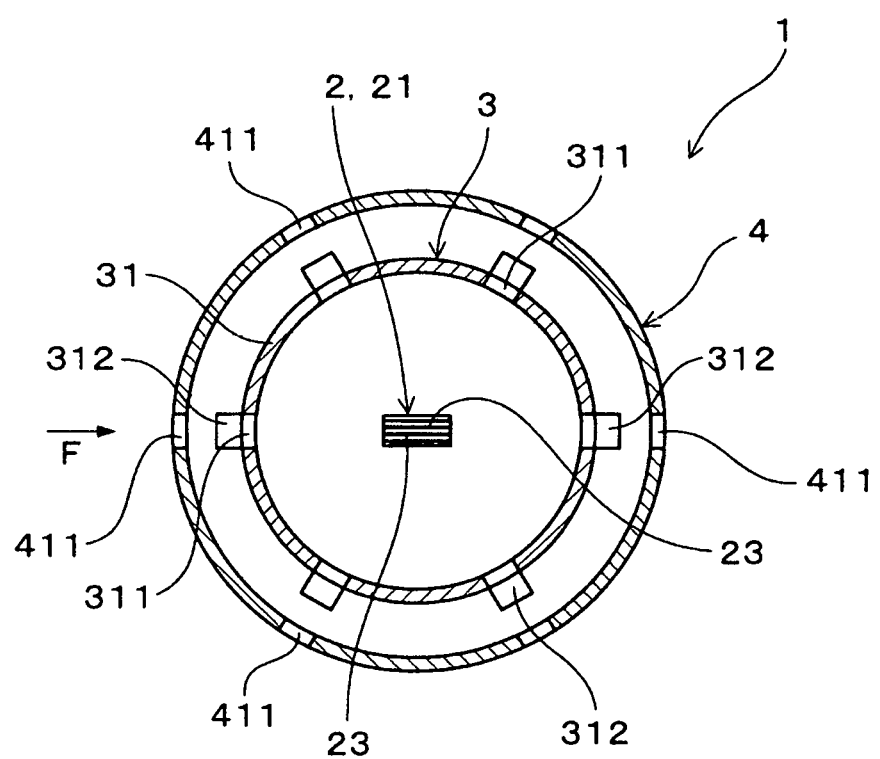
FIG. 12 is a diagram illustrating another example of the particulate matter detection sensor, according to the fourth embodiment.

FIG. 12 shows the particulate matter detection sensor 1 in which the rectifying member 312 in each of the exhaust gas introduction holes 311 is formed into a substantially square shape when viewed from the axial direction D.

The rest of the configuration is similar to the third embodiment. Of the reference signs used in the present embodiment and the drawings related to the present embodiment, like reference signs used in the third embodiment indicate components similar to those of the third embodiment unless otherwise specified.

What is claimed is:

1. A particulate matter detection sensor, comprising:
    a particulate matter detection unit including a deposition portion on which a part of particulate matter contained in an exhaust gas discharged from an internal combustion engine is deposited, and a plurality of detection electrodes disposed being spaced apart from each other on the deposition portion, wherein an output of an electrical signal is changed according to change of electrical characteristics due to the deposition of the particulate matter on the deposition portion; and
    a cover member including a cylindrical cover wall arranged so as to surround the particulate matter detection unit, wherein:
    the deposition portion of the particulate matter detection unit is disposed so as to be oriented towards a tip side in an axial direction of the cover member; and
    the cover wall of the cover member is provided with a plurality of exhaust gas introduction holes which are formed at positions closer to the tip side than the deposition portion is, such that the full extent of each of the plurality of exhaust gas introduction holes is closer to the tip side than the deposition portion in the axial direction of the cover member.

2. The particulate matter detection sensor according to claim 1, wherein the plurality of exhaust gas introduction holes, when viewed from the axial direction, are formed at even intervals.

3. The particulate matter detection sensor according to claim 1, wherein the cover member has an exhaust gas discharge hole which is opened in a tip thereof.

4. The particulate matter detection sensor according to claim 1, wherein the exhaust gas introduction holes are each provided with a rectifying member which is designed to come close to the deposition portion as the rectifying member inclines towards the inside of the cover member.

5. The particulate matter detection sensor according to claim 1, wherein the cover member has an outer periphery around which a cylindrical outer cover member is arranged so as to be coaxial with the cover member, the outer cover member having a plurality of outer introduction holes so that an exhaust gas introduced from the plurality of outer introduction holes is ensured to be introduced to the inside of the cover member from the exhaust gas introduction holes after change of the introduction direction.

6. The particulate matter detection sensor according to claim 5, wherein the plurality of outer introduction holes are formed at positions closer to the tip side than the plurality of exhaust gas introduction holes are.

7. The particulate matter detection sensor according to claim 6, wherein, when viewed from the axial direction, the plurality of outer introduction holes are formed so as to be radially align with the respective plurality of exhaust gas introduction holes.

8. The particulate matter detection sensor according to claim 5, wherein, when viewed from the axial direction, the plurality of outer introduction holes are formed at positions deviated in a circumferential direction from positions of the respective plurality of exhaust gas introduction holes.

9. The particulate matter detection sensor according to claim 5, wherein the outer cover member has an outer discharge hole which is opened in a tip thereof.

10. The particulate matter detection sensor according to claim 1, wherein the particulate matter detection unit changes an output of the electrical signal in accordance with change in an electrical resistance across the detection.

\* \* \* \* \*